March 11, 1941.   W. J. JOYCE, JR   2,234,765
FRICTION CLUTCH
Filed March 31, 1939   3 Sheets-Sheet 1

Inventor
William J. Joyce Jr.
By Blackmore, Spencer & Flint
Attorneys

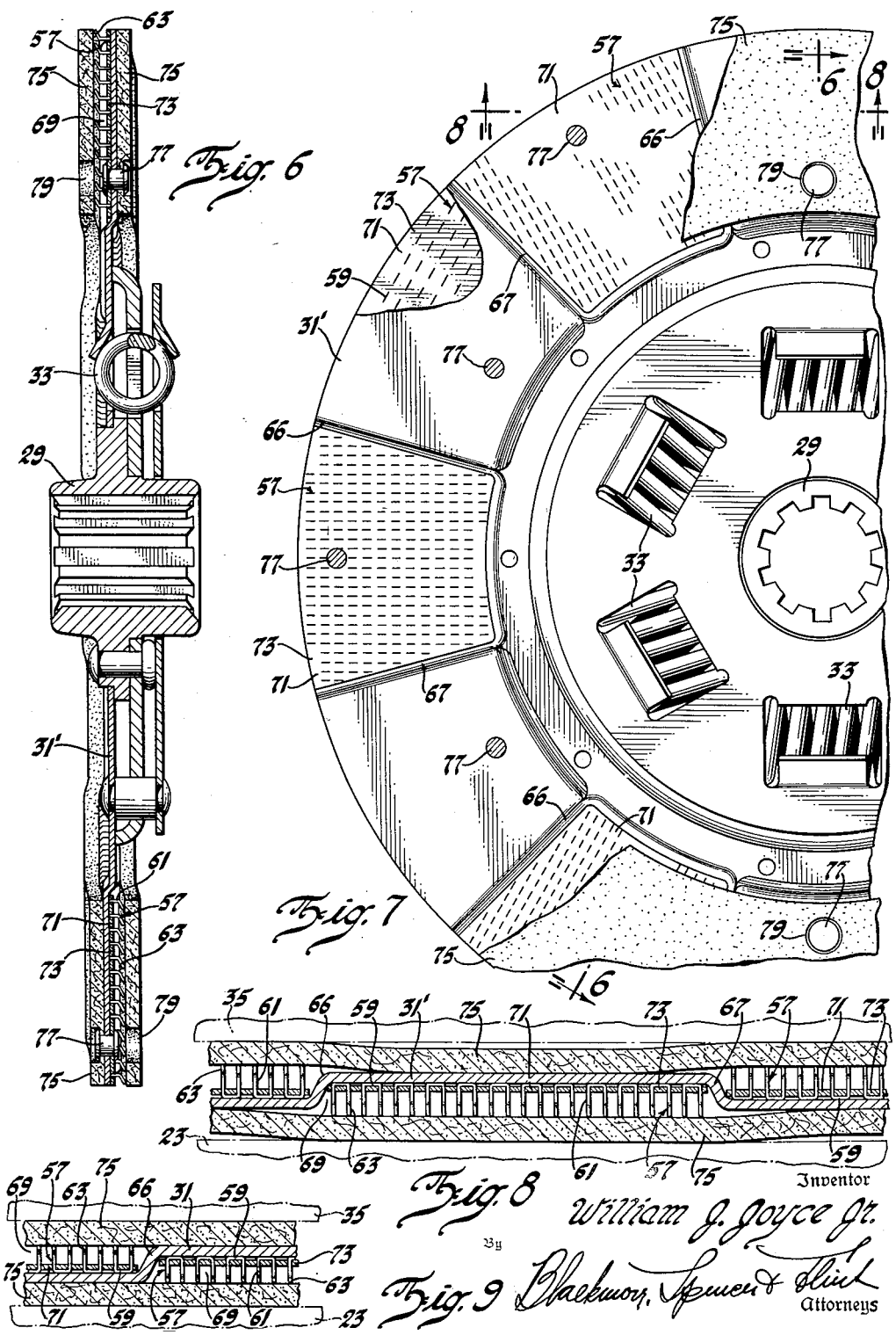

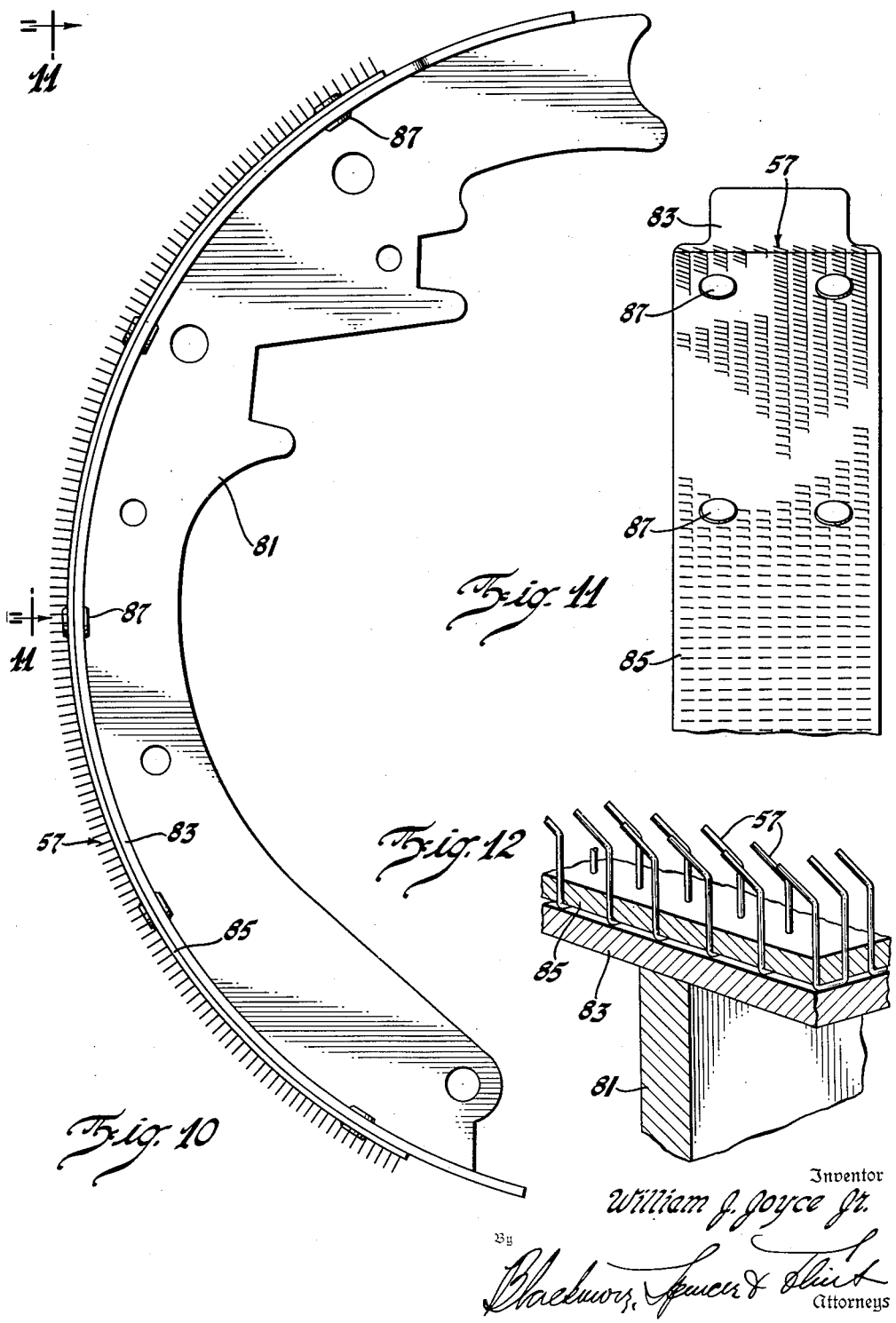

Patented Mar. 11, 1941

2,234,765

UNITED STATES PATENT OFFICE 2,234,765

FRICTION CLUTCH

William J. Joyce, Jr., Dayton, Ohio, assignor to General Motors Corporation, Detroit, Mich., a corporation of Delaware Application March 31, 1939, Serial No. 265,100

8 Claims. (Cl. 192—107)

This invention relates to friction devices such as clutches and brakes and is the result of an effort to improve the driven member of a clutch through which the engine of a motor vehicle drives the propeller shaft. An object of the invention is to produce a brake or clutch member wherein improved cushioning and frictional means is used.

Other objects will be understood from the following description.

On the drawings:

Figure 6 is a transverse section through a modified form of driven plate, the section being on line 6—6 of Figure 7.

Figure 7 is an elevation of the form shown by Figure 6.

Figure 8 is a section on line 8—8 of Figure 7.

Figure 9 is a view like Figure 8 but showing the parts in changed position.

Figure 10 is a view in side elevation of a brake shoe having a novel form of friction lining.

Figure 11 is a face view of the brake shoe as seen from line 11—11 of Figure 10.

Figure 12 is a detail in perspective.

Figure 1:
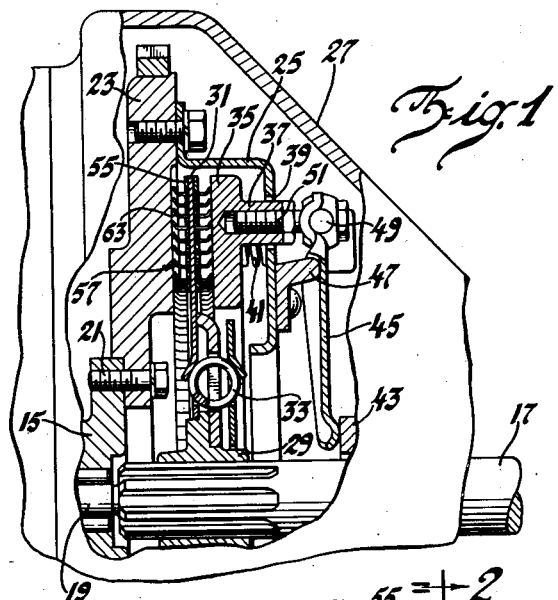
Figure 1 is a view in transverse section of the novel clutch.
Figure 2:
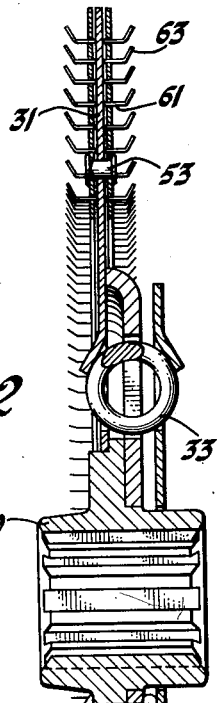
Figure 2 is a transverse section through the driven member of the clutch, the section being on line 2—2 of Figure 3.
Figure 3:
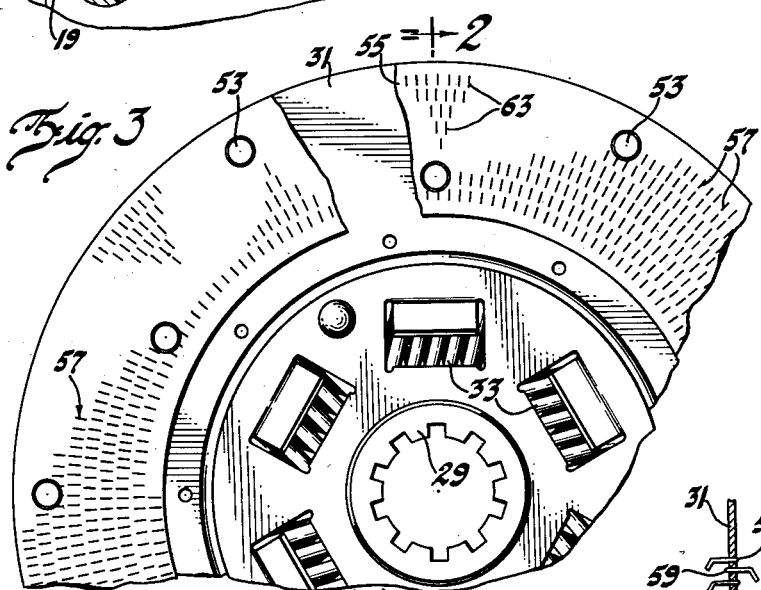
Figure 3 is a view of the driven member in elevation.

Referring by reference characters to the drawings the end of an engine shaft is identified by reference character 15 and a coaxial transmission shaft is seen at 17, there being a pilot connection between the two shafts at 19.

Fastening means 21 secure a flywheel 23 to the engine shaft. To the flywheel there is secured a cover 25. An outer casing 27 is provided as usual. The driven shaft 17 projects through casing 27 and within the cover 25. It carries slidably but non-rotatably the hub 29 of the driven member. The driven member also includes a driven plate 31. If desired, the driven plate and the hub may be connected by substantially conventional torque transmitting springs 33. A pressure plate 35 is slidable axially relative to the flywheel but rotates jointly therewith. This relationship may be provided in any way preferred.

The drawings show the pressure plate provided with lugs 37 which project through openings 39 in the cover to transmit the rotation and to permit the sliding motion. At 41 is one of a plurality of springs which function to effect the gripping of the driven plate between the flywheel and the pressure plate. To withdraw the pressure plate is a collar 43 which reciprocates to rotate fingers 45. Each finger rotates about a fulcrum 47 and has an end suitably connected as at 49 to the head of a member 51 threaded into a lug 37.

It is customary to distort the outer portion of the equivalent of plate 31 to form spring tongues and to rivet annular friction facings to both sides of the outer portion of the plate over such distorted tongues. The invention of this application is concerned with a novel friction facing. To each side of the outer region of the driven plate 31 there is secured by rivets 53 an annular member 55 which may be of metal or fabric of considerable thickness treated with Neoprene or other suitable heat and oil resisting material to give it stiffness and body. Into the member 55 prior to its assembly there have been inserted a plurality of wire staples each of which is marked as a whole by numeral 57. The bases 59 of the staples lie between the driven plate 31 and the members 55. The legs 61 of the staples project through the member 55 and after extending a short distance at right angles to the plane of the members 55 the ends 63 are bent radially as shown.

Figure 1 shows the clutch released. When the pressure plate moves toward the flywheel the bent ends 63 tend to move into parallelism with the planes of the flywheel and pressure plate. The points 65 from which the ends 63 are bent are sufficiently spaced from the members 55 to provide space into which the staples may be moved as the pressure plate advances toward the flywheel in the process of clutch engagement. In this form of the invention the staples act as a cushion to ease the engaging action of the springs 41 and they also serve as the friction facings.

Figure 5:
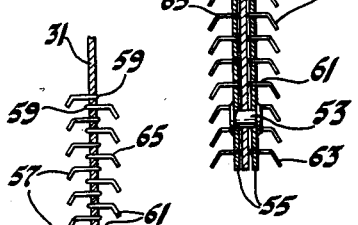
Figure 5 is a transverse section of a second form.
Figure 4:
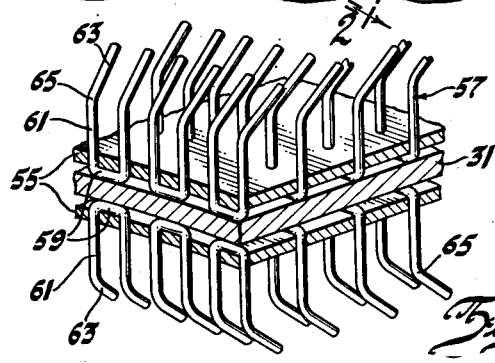
Figure 4 is a perspective of a part of the driven member.

In Figure 5 the inventive idea is shown embodied in a form where the members 55 are omitted. The staples 57 are used as before but their bases are on opposite sides of the driven plate 31. The legs 61 extend through the driven plate 31 and are arranged as before to engage both the flywheel and the pressure plate as frictional members and they also serve as resilient cushions. It is intended that in this form of the invention the number of staples projecting from the two faces shall be substantially equal.

In Figures 6, 7, 8 and 9 is shown a form of the invention where the staples provide the cushioning action only but where conventional facings are used to provide the friction. In this form a driven plate 31' is connected with the hub 29 by torque transmitting springs 33 as before. The plate 31' is formed with alternating bends as seen at 66 and 67 in Figure 8 thereby forming as it were segmental pockets 69 alternately arranged in a circumferential series. Inserted in these pockets are segmental members identified as a whole by numerals 71. These members 71 include supports 73 conforming in characteristics to the members 55 described above. They carry staples 57 corresponding to the staples of Figures 1 to 4. There are a series of members 73 carrying staples projecting toward the flywheel and between each two members 73 are others in the alternating pockets with staples directed toward the pressure plate. On each side of the driven plate is an annular friction facing 75. As shown in the drawings the friction facings contact alternately with the ends of a collection of staples and a part of plate 31'. The parts are secured together by rivets 77, the rivets connecting each member 73 with the base of the pocket within which it is assembled and the contacting facing. Suitable openings 79 are provided in the opposite facing to give access to the rivets.

Figure 8 shows the assembly before being placed under compression. Figure 9 shows how the end portions 63 of the staples have been flattened, and resiliently affording the cushion action. In this form of the invention the staples are used for their resiliency only. The facings 75 constitute the frictionally engaging members. If so desired the planes defined by the two legs of the staples in any one segment may alternate with the corresponding planes of the legs of the staples in the adjacent segments. This is shown in Figure 7.

In addition to its use for clutches the inventive idea is useful in other relations where friction is used to serve some useful purpose.

In Figures 10 to 12 is shown one such other use. A brake shoe has a web 81 and a flange 83. Instead of riveting a conventional friction lining to the flange, there is riveted thereto just such a friction member as has been suggested above for use in clutches. A member 85 having the characteristics of member 55 of Figure 1 is similarly provided with staples and secured to the flange by rivets 87. It is believed that the utility of the invention in connection with brakes will be understood without further explanation.

I claim:

1. In a friction device, first and second mechanical members mounted for relative movement, at least one of said members having anchored thereto frictional means adapted to engage the other member, said frictional means including a plurality of wire elements projecting toward said other member, each of the ends of said wire elements being bent at a point between the ends of said elements from the axis of said element whereby said other member may frictionally contact the sides of said bent portions, the plane of contact being spaced from the plane of the anchor for the frictional means whereby said elements afford a cushioned support.

2. In a clutch, driving and driven members, a plurality of staples having their bases secured to one of said members and their legs extending toward the other member, said legs having their ends bent from the axis thereof, the point of bending being between the ends of the legs.

3. In a clutch, two driving members having relative axial movements, a driven member therebetween, said driven member having staples with legs extending toward both the driving members.

4. The invention defined by claim 3, together with friction facings carried by said driven member and engaging the ends of said legs.

5. In a clutch, two driving members having relative axial movement, a driven member therebetween, said driven member having a circumferential series of oppositely opening pockets, a staple carrying member in each pocket, the legs of said staples projecting toward opposite driving member.

6. The invention defined by claim 5, together with friction facings carried by said driven member and overlying the ends of said legs.

7. A friction brake shoe having a flange, a plurality of wires extending radially from said flange, the ends of said wires being bent from their axes at points between the ends of said radial wires, the sides of said bent portions constituting a friction surface, the plane of said surface being spaced from the plane of support.

8. A friction brake shoe having a flange, a support carried by said flange, a plurality of staples having their bases anchored between said support and flange and intermediately bent legs extending radially from said flange and support, the sides of said bent portions constituting a friction surface, the plane of said surface being spaced from the plane of support.

WILLIAM J. JOYCE, Jr.